United States Patent
Shivanna et al.

(10) Patent No.: US 11,375,006 B1
(45) Date of Patent: Jun. 28, 2022

(54) METHODS AND SYSTEMS FOR RATING WORKLOADS BASED ON NETWORK INTERFACE DEVICE RESOURCES AND FOR OPTIMAL SCHEDULING

(71) Applicant: Pensando Systems Inc., Milpitas, CA (US)

(72) Inventors: Manjunath Shivanna, Bangalore (IN); Chaitanya Huilgol, Bengaluru (IN); Sudheendra Gopinath, Bangalore (IN)

(73) Assignee: Pensando Systems, Inc., Milpitas, CA (US)

( * ) Notice: Subject to any disclaimer, the term of this patent is extended or adjusted under 35 U.S.C. 154(b) by 0 days.

(21) Appl. No.: 17/135,852

(22) Filed: Dec. 28, 2020

(51) Int. Cl.
*H04L 29/08* (2006.01)
*H04L 67/1008* (2022.01)
*H04L 41/5054* (2022.01)
*H04L 67/50* (2022.01)
*H04L 41/5051* (2022.01)
*H04L 49/00* (2022.01)

(52) U.S. Cl.
CPC ...... *H04L 67/1008* (2013.01); *H04L 41/5051* (2013.01); *H04L 41/5054* (2013.01); *H04L 49/3063* (2013.01); *H04L 67/22* (2013.01)

(58) Field of Classification Search
CPC . H04L 67/1008; H04L 67/22; H04L 41/5054; H04L 41/5051; H04L 49/3063
See application file for complete search history.

(56) References Cited

U.S. PATENT DOCUMENTS

| | | | |
|---|---|---|---|
| 8,127,291 B2 | 2/2012 | Pike et al. | |
| 9,769,084 B2 | 9/2017 | Udupi et al. | |
| 9,846,589 B2 | 12/2017 | Udupi et al. | |
| 10,205,677 B2 | 2/2019 | Udupi et al. | |
| 10,348,628 B2 | 7/2019 | Antony | |
| 10,715,460 B2 | 7/2020 | Brooker et al. | |
| 2007/0011330 A1* | 1/2007 | Dinker | G06F 11/3409 709/226 |
| 2011/0219118 A1* | 9/2011 | Cowan | H04L 43/04 709/224 |

(Continued)

OTHER PUBLICATIONS

Refining Micro Services Placement over Multiple Kubernetes-orchestrated Clusters employing Resource Monitoring Seunghyung Lee;Seokho Son;Jungsu Han;JongWon Kim. 2020 IEEE 40th International Conference on Distributed Computing Systems (ICDCS) (Year: 2020).*

*Primary Examiner* — Michael Won
(74) *Attorney, Agent, or Firm* — Loza & Loza LLP

(57) ABSTRACT

Cloud services are often implemented as instances of applications having one or more components running on the nodes (e.g., host computers or servers) of a data center. Network services are thereby provided to a workload that uses the network resources of network interface devices (e.g., a NIC, switch, or router). The workload is a first instance of an application. The network interface devices can produce resource usage measurements of usage metrics that quantify usage of the network resources by the workload. The resource measurements can be used to produce an application network profile of the application. The application network profile can be used to select at least one of a plurality of nodes on which a second instance of the application is launched.

20 Claims, 14 Drawing Sheets

(56) References Cited

U.S. PATENT DOCUMENTS

| | | | | |
|---|---|---|---|---|
| 2012/0284408 | A1* | 11/2012 | Dutta | H04L 67/1002 |
| | | | | 709/226 |
| 2012/0303654 | A1* | 11/2012 | Ferris | G06F 16/119 |
| | | | | 707/769 |
| 2016/0277511 | A1* | 9/2016 | Fang | H04L 67/16 |
| 2017/0139462 | A1* | 5/2017 | Potlapally | H05K 7/1492 |
| 2018/0351804 | A1* | 12/2018 | Mohanram | H04L 41/0866 |
| 2019/0229998 | A1* | 7/2019 | Cattoni | H04L 41/14 |
| 2019/0238665 | A1* | 8/2019 | Bosshart | H04L 41/0803 |
| 2020/0007473 | A1* | 1/2020 | Kim | H03M 13/096 |
| 2020/0082495 | A1* | 3/2020 | Featonby | G06F 9/45533 |
| 2020/0314011 | A1* | 10/2020 | Deval | H04L 45/7457 |
| 2020/0341794 | A1* | 10/2020 | Martin | H04L 43/065 |
| 2020/0351373 | A1* | 11/2020 | Gupta | H04L 67/306 |
| 2021/0208948 | A1* | 7/2021 | Sagi | G06F 9/545 |
| 2021/0243247 | A1* | 8/2021 | He | H04L 67/16 |
| 2021/0263744 | A1* | 8/2021 | Crupnicoff | G06F 9/3836 |

\* cited by examiner

1400

| Network Resource Type | Usage Metric | Resource Usage Measurement |
|---|---|---|
| Flow Resource | Number of IP Fragmentation Operations | Integer Value |
| Flow Resource | Number of IP Reassembly Operations | Integer Value |
| Flow Resource | Number of Flows | Integer Value |
| Flow Resource | Number of Short Lived Flows | Integer Value |
| Flow Resource | Number of Long Lived Flows | Integer Value |
| Flow Resource | Number of Filter Rules | Integer Value |
| Flow Resource | Number of Policing Rules | Integer Value |
| Connection Resource | Number of Connections | Integer Value |
| Connection Resource | Connections Per Second | Integer Value |
| Layer 7 Resource | Number of Parsing Operations | Integer Value |
| Layer 7 Resource | Number of L7 Routing Rules | Integer Value |
| Layer 7 Resource | Number of TLS Terminations | Integer Value |
| Layer 7 Resource | Number of TLS Proxies | Integer Value |
| Security Resource | Number of Encryption Operations | Integer Value |
| Security Resource | Number of DPI Submissions | Integer Value |
| Security Resource | Number of IDS Submissions | Integer Value |
| QoS Resource | Number of Buffers | Integer Value |
| QoS Resource | Number of Queues | Integer Value |
| Storage Resource | Number of Deduplication Operations | Integer Value |
| Storage Resource | Number of Compression Operations | Integer Value |
| Storage Resource | Number of Secure Hash Operations | Integer Value |
| Storage Resource | Number of Checksum Operations | Integer Value |
| RDMA Resource | Number of RDMA Queue Pairs | Integer Value |
| NVMe-oF Resource | Number of NVMe-oF Queue Pairs | Integer Value |
| Forwarding Resource | Number of Routing Adjacencies | Integer Value |
| PCIe Device Resource | Number of PFs | Integer Value |
| PCIe Device Resource | Number of VFs | Integer Value |
| Bandwidth Resource | Networking I/O Bandwidth | Integer Value |
| Bandwidth Resource | Storage I/O Bandwidth | Integer Value |
| Time Resource | First Seen Timestamp | Integer Value |
| Time Resource | Last Seen Timestamp | Integer Value |

Columns: 1401, 1402, 1403

FIG. 14

METHODS AND SYSTEMS FOR RATING WORKLOADS BASED ON NETWORK INTERFACE DEVICE RESOURCES AND FOR OPTIMAL SCHEDULING

TECHNICAL FIELD

The embodiments relate to computer networks, cloud computing, microservice architecture, containerized applications, workload orchestration, network appliances, routers, switches, load balancers, packet processing pipelines, P4 packet processing pipelines, programmable packet processing pipelines implemented using special purpose circuitry, and HPC (high performance computing).

BACKGROUND

High traffic cloud services are often implemented as applications having one or more components running on nodes (e.g., host computers, servers, etc.) serving client requests. In many cases, additional instances of applications are automatically created to meet increasing or spiking demand. Load balancers can then distribute the load across the multiple instances. Data centers can run numerous cloud services on a plethora of nodes and can create the new instances on underutilized nodes. The creation and deletion of the instances can be automated using workload orchestrators such as Kubernetes and VMware VCenter.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include providing network services to a workload that is a first instance of an application that uses a plurality of network resources of a network interface device, producing, by the network interface device, a plurality of resource usage measurements for a plurality of usage metrics that quantify usage of the network resources by the workload, using the resource usage measurements to produce an application network profile of the application, using the application network profile to select at least one of a plurality of nodes for a second instance of the application, and creating the second instance of the application on the at least one of the nodes.

Another aspect of the subject matter described in this disclosure can be implemented by a system. The system can include a network interface device configured to provide network services to a workload that is a first instance of an application that uses a plurality of network resources of the network interface device, and produce a plurality of resource usage measurements for a plurality of usage metrics that quantify usage of the network resources by the workload. The network interface device can also be configured to provide the resource usage measurements to an application profiler configured to use the resource usage measurements to produce an application network profile of the application for a workload orchestrator configured to launch a plurality of instances of the application on a plurality of nodes based on the application profile.

Yet another aspect of the subject matter described in this disclosure can be implemented by a system comprising a means for producing a plurality of resource usage measurements for a plurality of usage metrics that quantify usage of network resources by a first instance of an application, a means for using the resource usage measurements to produce an application network profile of the application, and a means for launching a second instance of the application on at least one of a plurality of nodes selected using the application network profile.

In some implementations of the methods and devices a packet processing pipeline of the network interface device is configured to produce the resource usage measurements. In some implementations of the methods and devices, the implementation includes using workload identification data to associate the workload with an application identifier of the application, and producing the application network profile based on the resource usage measurements and the application identifier. In some implementations of the methods and devices the workload identification data includes an IP address. In some implementations of the methods and devices the resource usage measurements quantify the usage of a flow resource, a connection resource, a layer 7 service, a security resource, a QoS resource, a storage resource, an RDMA resource, an NVME-oF resource, a forwarding resource, a bandwidth resource, PCIe physical functions, or PCIe virtual functions.

In some implementations of the methods and devices the application network profile is associated with a Kubernetes label. In some implementations of the methods and devices the application includes a plurality of components configured for running on the nodes as independently deployable services. In some implementations of the methods and devices the network interface device is a PCIe card installed in a host computer running at least one component of the workload. In some implementations of the methods and devices the application network profile includes a plurality of network usage values that are provided to a workload orchestrator configured to launch instances of the application. In some implementations of the methods and devices a plurality of Kubernetes labels are associated with the network usage values. In some implementations of the methods and devices the application network profile includes a plurality of network usage values associated with a plurality of Kubernetes labels and is provided to a workload orchestrator configured to launch instances of the application.

In some implementations of the methods and devices, the implementation includes the application profiler, wherein the application profiler is further configured to use workload identification data to associate the workload with an application identifier of the application, and produce the application network profile based on the resource usage measurements and the application identifier. In some implementations of the methods and devices the application network profile includes a plurality of network usage values that are provided to the workload orchestrator. In some implementations of the methods and devices, the implementation includes the application profiler, the workload orchestrator, wherein the application network profile includes a plurality of network usage values associated with a plurality of Kubernetes labels. In some implementations of the methods and devices the means for producing the plurality of resource usage measurements includes a packet processing pipeline.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 14 is a table of network resource types, usage metrics, and resource usage measurements according to some aspects.

Throughout the description, similar reference numbers may be used to identify similar elements.

DETAILED DESCRIPTION

Figure 1:
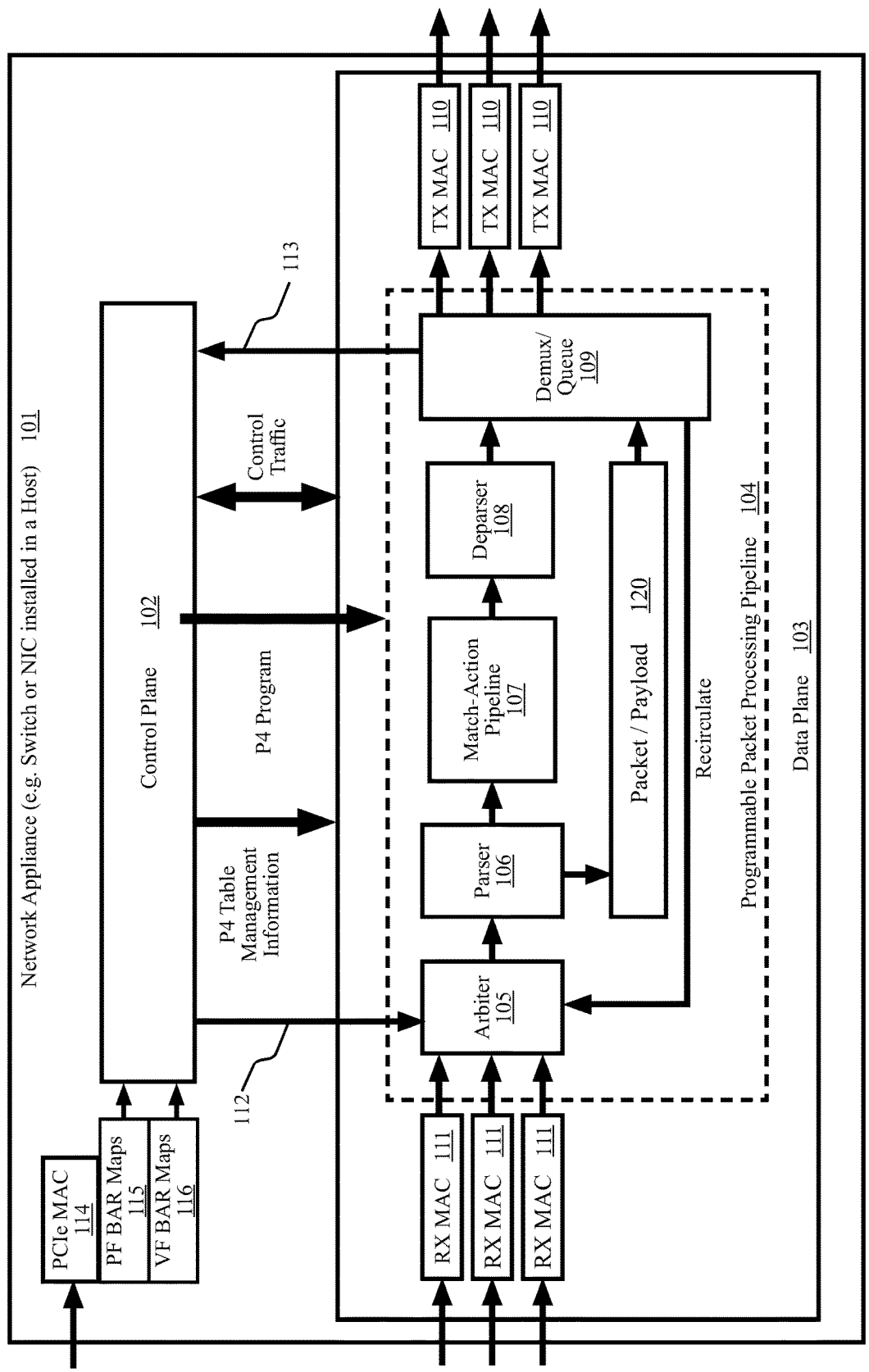
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

One of the problems encountered in orchestrating workloads for cloud-based applications is selecting which nodes on which to launch which instances of applications or components of applications. Cloud-based applications are often deployed in data centers that provide the compute resources and the networking resources used by the cloud-based applications. A cloud based application can be architected as a single standalone component or as cooperating components where each component implements part of the application. The components can include load balancers, database servers, web servers, etc. The various components can run on one or more nodes. The nodes are typically computers provided by the data center. Workload orchestrators such as Kubernetes and VMWare VCenter can be used for scaling the numbers of running components to meet workload demands. For example, as more users attempt to use the cloud-based service, the workload orchestrator can observe that additional instances of the application or of certain components are needed in order to service the increased workload. The workload orchestrator can then launch additional instances on the current nodes or on additional nodes. The nodes can be selected based on criteria such as the node's available CPU cores, memory, or storage.

A problem with using such criteria is that the node's available networking resources is ignored. As such, network intensive applications and components (e.g., load balancers, certain storage servers, etc.) may be instantiated on the same node, leading to poor application performance. Another problem is that data centers, lacking visibility into the available network resources, often over provision networking resources such that the networking resources are less likely to be a bottleneck to the components running on the node.

A solution is to use application network profiles that indicate the network resources that may be required by the application and by the components of the application. The issue with developing application network profiles is that the data can be obtained only from a network appliance providing network services for the application. The network resources available to a node may be the network resources provided by a network appliance such as a network interface card (NIC) installed in the node. The network appliance can measure the network resources consumed by the components of a network application and can provide those measurements to an application profiler that produces an application network profile. The orchestrator may then use the application network profile in selecting the nodes onto which instances of the application components are deployed.

One advantage of deploying components based at least in part on the network application profile is that network intensive components can be instantiated on nodes that have sufficient networking resources available. For example, load balancers may be instantiated on different nodes. Another advantage is that the node's networking resources may be better matched to the required resources. For example, a node can be designed to provide resources for a specific balance of applications and components without over provisioning the number of CPU cores, memory, storage, or networking resources.

In the field of data networking, the functionality of network appliances such as switches, routers, and network interface cards (NICs) are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O and InfiniBand traffic flows, extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

FIG. 1 is a functional block diagram of a network appliance having a control plane and a data plane and in which aspects may be implemented. A network appliance 101, such as a NIC, can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector or "PHV." The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A NIC 101 can have a peripheral component interconnect extended (PCIe) interface such as PCIe media access control (MAC) 114. A PCIe MAC can have a base address register (BAR) at a base address in a host system's memory space. Processes, typically device drivers within the host system's operating system, can communicate with the NIC via a set of registers beginning with the BAR. Some PCIe devices are single root input output virtualization (SR-IOV) capable. Such PCIe devices can have a physical function (PF) and multiple virtual functions (VFs). A PF BAR map 115 can be used by the host machine to communicate with the PCIe card. A VF BAR map 116 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as RDMA transfers to other VMs running on the same or other host computers. Similarly, the NIC can provide NVMe and SCSI PFs and VFs to VMs running on the host.

Figure 2:
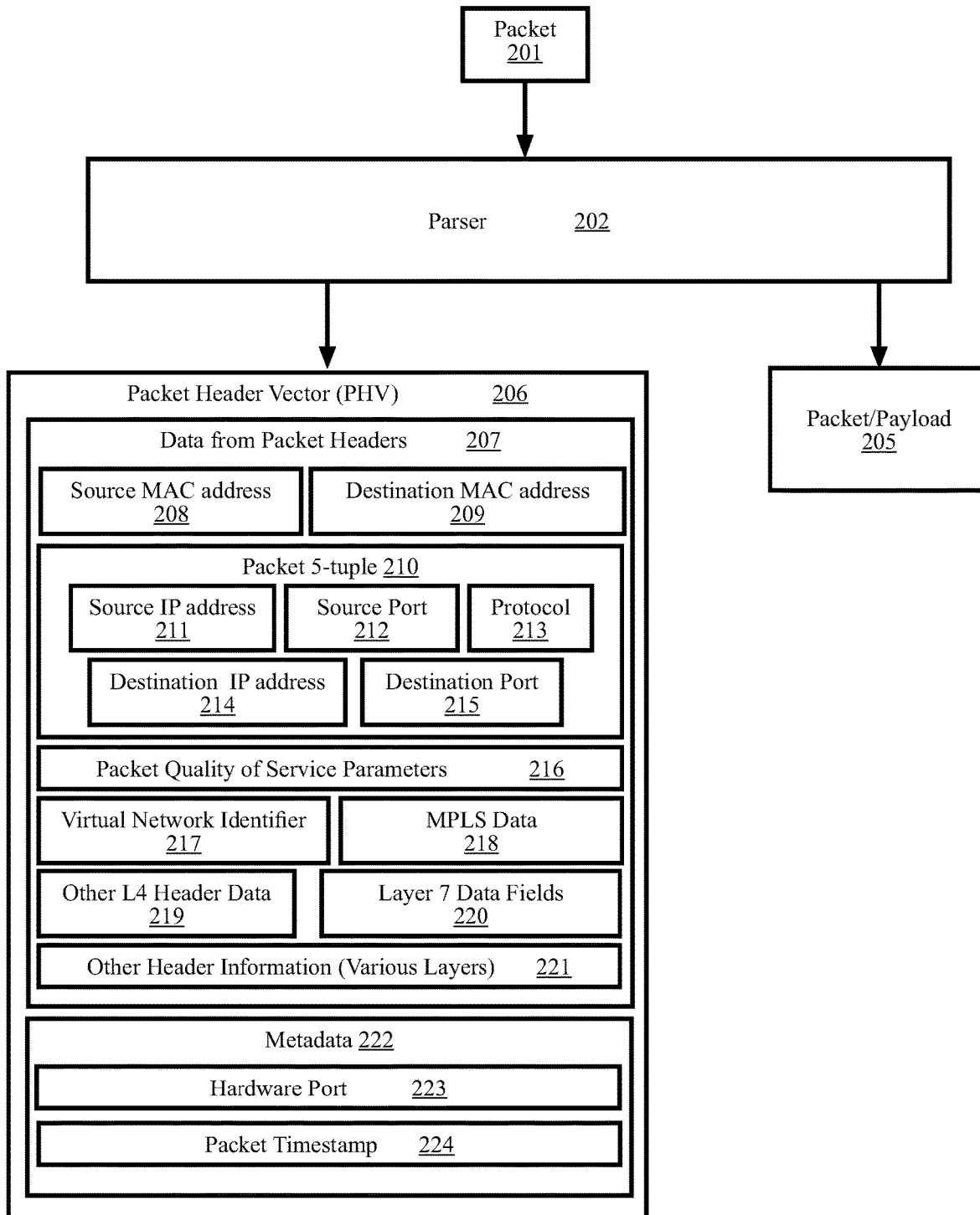
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The layer 7 fields 220 can be obtained from a layer 7 packet contained in a layer 4 payload. Some of the layer 7 fields can be layer 7 header fields from the header of a layer 7 packet. Some of the layer 7 fields can be layer 7 data fields from the payload of a layer 7 packet. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Those practiced in protocols such as InfiniBand realize that the data packets communicated among InfiniBand consumers also have well defined and standardized formats. As such, InfiniBand packets, PDUs, and packet headers can be easily created and processed by a programmable data plane such as the data plane of a P4 programmable NIC. Specifically, the parser can parse InfiniBand packets and PDUs, the match-action pipeline can process InfiniBand packets and PDUs, the deparser can assemble InfiniBand packets and PDUs, the demux/queue can assemble InfiniBand packets and PDUs, and the network appliance or NIC can send and receive InfiniBand packets and PDUs.

Those practiced in protocols such as NVMe/TCP and iSCSI realize that NVMe and iSCSI data packets also have well defined and standardized formats. As such, NVMe/TCP packets, PDUs, and packet headers can be easily created and processed by a programmable data plane such as the data plane of a P4 programmable NIC. Similarly, iSCSI packets, PDUs, and packet headers can be easily created and processed by a programmable data plane such as the data plane of a P4 programmable NIC. Specifically, the parser can parse NVMe and iSCSI packets and PDUs, the match-action pipeline can process NVMe and iSCSI packets and PDUs, the deparser can assemble NVMe and iSCSI packets and PDUs, the demux/queue can assemble NVMe and iSCSI packets and PDUs, and the network appliance or NIC can send and receive NVMe and iSCSI packets and PDUs.

Figure 3:
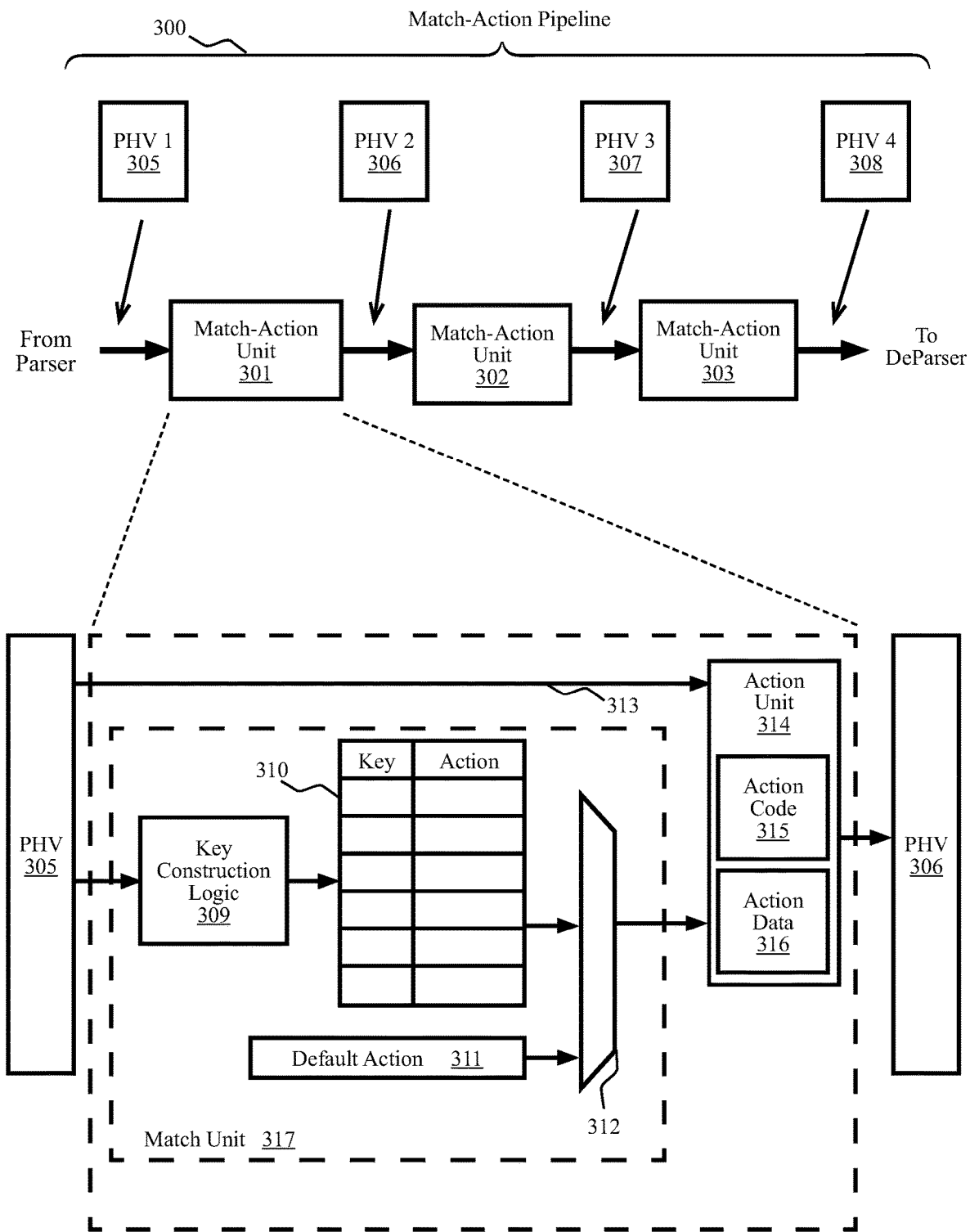
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table are managed by the control plane.

Figure 4:
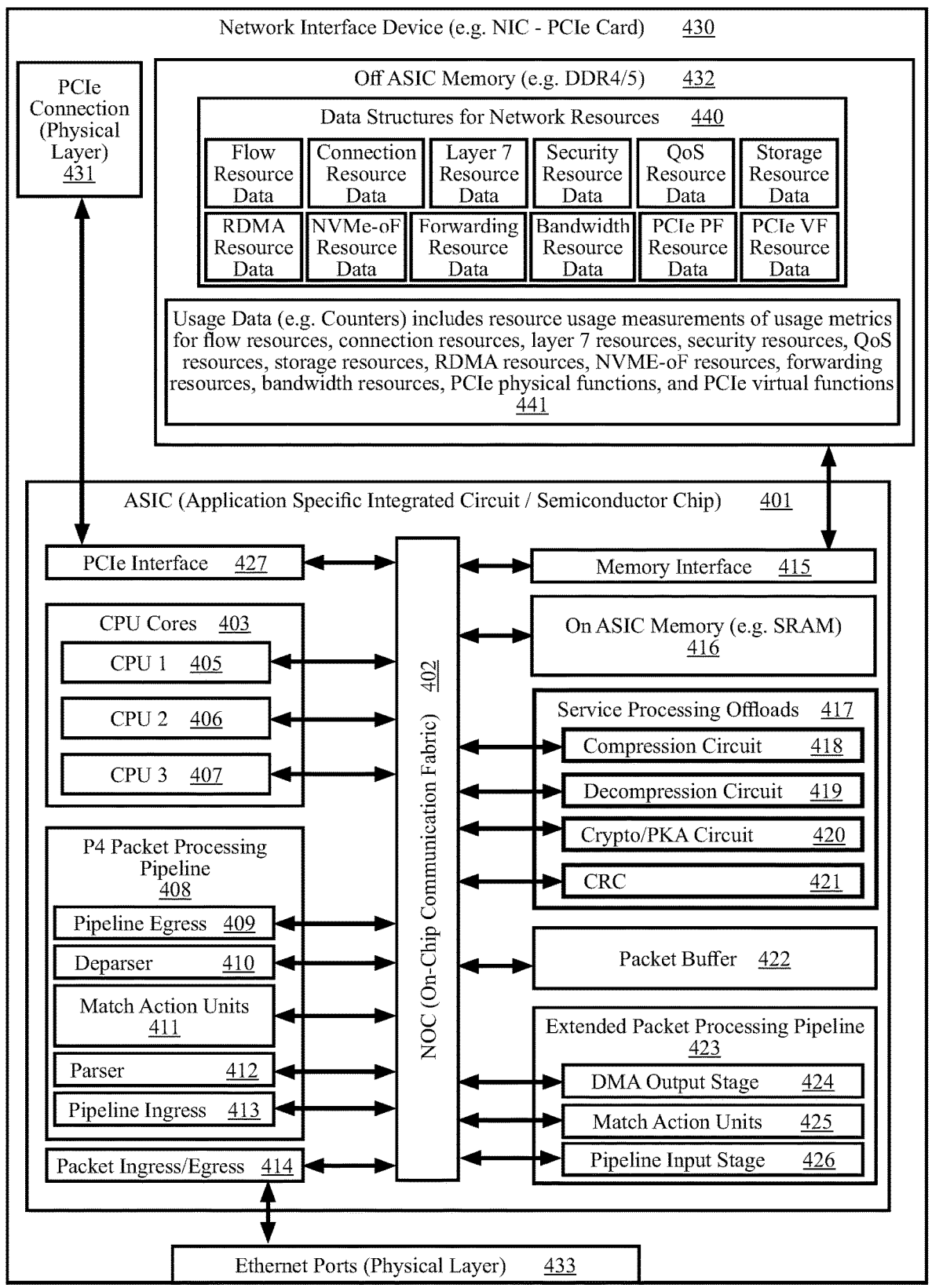
FIG. 4 is a functional block diagram of a NIC (network interface card) having an ASIC (application specific integrated circuit), according to some aspects.

FIG. 4 is a functional block diagram of a NIC 430 having an application specific integrated circuit (ASIC) 401, according to some aspects. The NIC can be installed in a host computer and can act as a network appliance for the host computer. The NIC 430 includes a PCIe connection 431, off ASIC memory 432, and ethernet ports 433. The PCIe connection provides for installing the NIC in a host computer having a PCIe bus. The off ASIC memory 432 can be one of the widely available memory modules or chips such as double data rate 4 (DDR4) synchronous dynamic random-access memory (SDRAM) such that the ASIC has access to many gigabytes of memory on the NIC 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of an NVMe card, an iSCSI card, and of a network appliance that processes network traffic flows carried by IP (internet protocol) packets.

The P4 packet processing pipeline 408 is a specialized set of elements for processing network packets such as IP (internet protocol) packets and InfiniBand PDUs (protocol data units). The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is currently defined in the "$P4_{16}$ Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The NIC 430 can include a memory 432 for running Linux or some other operating system, for storing data structures for network resource data 440, and for storing usage data 441. The data in the data structures can be used by the NIC when providing networking services and resources. Flow resource data can be used by the NIC for processing network traffic flows. Examples of the network traffic flows include traffic flows passing from the RX MACS to the TX MACS, and traffic flows passing between the host computer and the outside world via the data plane. Connection resource data can be used by the NIC for connection-oriented traffic flows, such as TCP, passing into or through the network interface device. Layer 7 resource data can be used by the NIC for providing layer 7 resources and support such as parsing L7 headers, providing transport layer security (TLS) terminations, implementing L7 routing, etc. Security resource data can be used by the NIC for providing security resources such as encryption, decryption, deep packet inspection (DPI), and intrusion detection via an intrusion detection system (IDS).

Quality of Service (QoS) resource data can be used by the NIC for providing network resources at or above a desired QoS. For example, to meet a desired quality of service the NIC can allocate buffers and queues for use in providing the service. Storage resource data can be used by the NIC to support storage operations by providing data deduplication, data compression, secure hash calculations, checksum calculations, etc. Remote direct memory access (RDMA) resource data can be used by the NIC to support InfiniBand RDMA operations. The RDMA resource data can include RDMA queue pairs, work queue entries, etc.

Non-volatile memory express over fabric (NVMe-oF) resource data can be used by the NIC to support NVMe-oF operations. The NVMe-oF resource data can include NVMe queue pairs and other data used for NVMe-oF. Forwarding resource data can be used by the NIC for making routing decisions for network traffic flows. The forwarding resource data can include routing tables that include routing adjacencies. The forwarding resource data can be used to configure a packet processing pipeline for forwarding packets. Bandwidth resource data can be used by the NIC to support the provision of network bandwidth for networking operations such as supporting host computer processes with network bandwidth, storage bandwidth, etc. PCIe PF resource data can be used by the NIC to support providing PFs to processes running on the host computer. Similarly, PCIe VF resource data can be used by the NIC to support providing VFs to processes running on the host computer. The NIC 430 can provide numerous PFs and VFs because the memory 432 can include data structures implementing PCIe base address registers and PCIe configuration registers. As such, the number of PFs and VFs implemented by the NIC can be controlled by the number of PCIe registers and other PCIe control structures instantiated in the memory 432.

Usage data 441 can contain measurements of the amount of networking resources used by processes running on the host computer. For example, the use of a resource can be measured by incrementing a counter associated with an application or workload. A network appliance such as the NIC 430 can implement synchronization primitives such as semaphores, memory locks, and atomic increment operations that can be used by either the control plane (CPU cores) or the data plane (match-action units, etc.) to increment and reset counters. The counter values can be used for computing additional statistics such as bandwidth, connections per second, etc.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline has match-action units 425 that can be arranged as a match-action pipeline such as match-action pipeline 300. The extended packet processing pipeline has a pipeline input stage 426 that can receive PHVs or directives to perform operations. For example, data in the PHV can indicate that the PHV is a directive for implementing an RDMA operation. The key construction logic 309 of the MPUs can use the data to form a key that indexes into a lookup table 310 to locate an action. The MPUs can thereby execute actions such that the DMA output stage 424 writes InfiniBand PDU payload data into the off ASIC memory 432 or into the host memory.

All memory transactions in the NIC 430, including host memory transactions, on board memory transactions, and registers reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
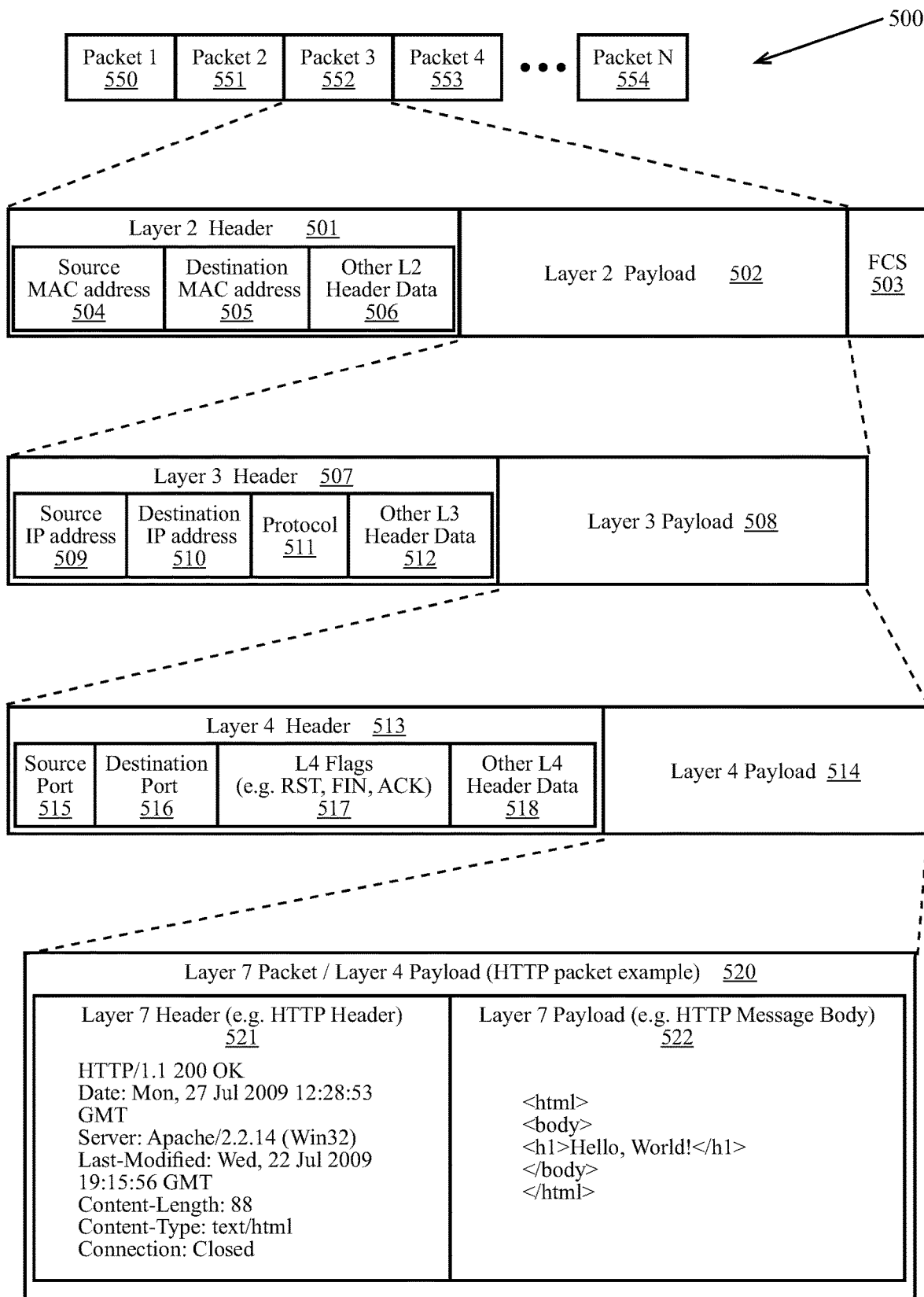
FIG. 5 illustrates packet headers and payloads of packets for network traffic flows including layer 7 fields according to some aspects.

FIG. 5 illustrates packet headers and payloads of packets for network traffic flows 500 including InfiniBand PDUs according to some aspects. A network traffic flow 500 can have numerous packets such as a first packet 550, a second packet 551, a third packet 552, a fourth packet 553, and a final packet 554 with many more packets between the fourth packet 553 and the final packet 554. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS). The layer 2 header can contain a source MAC address 504, a destination MAC address 505, and other layer 2 header data 506. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 507 and a layer 3 payload 508. The layer 3 header 507 can have a source IP address 509, a destination IP address 510, a protocol indicator 511, and other layer 3 header data 512. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 508 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 507 using protocol indicator 511. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 508 includes a TCP header and a TCP payload. UDP can provide for computer applications to send messages, in this case referred to as datagrams, to other hosts on an IP network using a connectionless model. When carrying UDP data, a layer 3 payload 508 includes a UDP header and a UDP payload. ICMP is used by network devices, including routers, to send error messages and operational information indicating success or failure when communicating with another IP address. ICMP uses a connectionless model.

A layer 4 packet can have a layer 4 header 513 and a layer 4 payload 514. The layer 4 header 513 can include a source port 515, destination port 516, layer 4 flags 517, and other layer 4 header data 518. The source port and the destination port can be integer values used by host computers to deliver packets to application programs configured to listen to and send on those ports. The layer 4 flags 517 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 514 can contain a layer 7 packet.

The application layer, often called layer 7, includes the protocols used by most applications for providing user services or exchanging application data over the network connections established by the lower level protocols. Examples of application layer protocols include RDMA over Converged Ethernet version 2 (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol units (such as TCP or UDP messages), which in turn use lower layer protocols to effect actual data transfer.

A layer 4 payload 514 may include a layer 7 packet 520. A layer 7 packet 520 can be an HTTP packet, an InfiniBand PDU, or some other L7 packet. A layer 7 packet 520 can include a layer 7 header 521 and a layer 7 payload 522. The illustrated layer 7 packet is an HTTP packet 520 that has an HTTP header 521 and an HTTP message body 522. The illustrated HTTP header includes header fields beginning with "HTTP/1.1" which indicates the HTTP packet conforms to the request for comment (RFC) 7231 of the internet engineering task force (IETF). The IETF is a consortium that develops and publishes standards for the Internet in the form of RFCs. IETF RFC 7231 titled "Hypertext Transfer Protocol (HTTP/1.1): Semantics and Content", was published in June, 2014. The HTTP message body is a hypertext markup language (HTML) document. HTML is a "living" standard that is currently maintained by Web Hypertext Application Technology Working Group (WHATWG).

Figure 6:
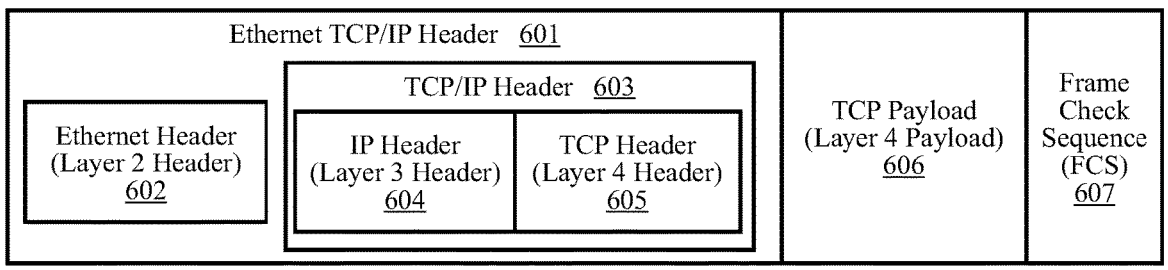
FIG. 6 illustrates an ethernet TCP/IP packet according to some aspects.

FIG. 6 illustrates an Ethernet TCP/IP packet according to some aspects. Ethernet packets, such as Ethernet TCP/IP packets, have an Ethernet header 602 and frame check sequence (FCS) 607. As discussed above, Ethernet is a layer 2 protocol. An Ethernet TCP/IP header 601 has an Ethernet header 602 and a TCP/IP header 603. The TCP/IP header 603 has an IP header 604 and a TCP header 605. The Ethernet TCP/IP packet has a TCP payload 606 as the layer 4 payload.

Figure 7:
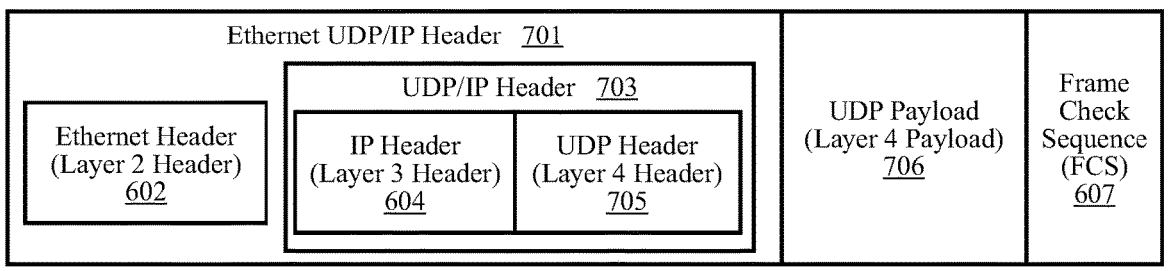
FIG. 7 illustrates an ethernet UDP/IP packet according to some aspects.

FIG. 7 illustrates an ethernet UDP/IP packet according to some aspects. An Ethernet UDP/IP packet differs from an Ethernet TCP/IP packet by having UDP as the layer 4 protocol. Ethernet UDP/IP packets, have an Ethernet header 602 and frame check sequence (FCS) 607. An Ethernet UDP/IP header 701 has an Ethernet header 602 and a UDP/IP header 703. The UDP/IP header 703 has an IP header 604 and a UDP header 705. The Ethernet UDP/IP packet has a UDP payload 706 as the layer 4 payload.

Figure 8:
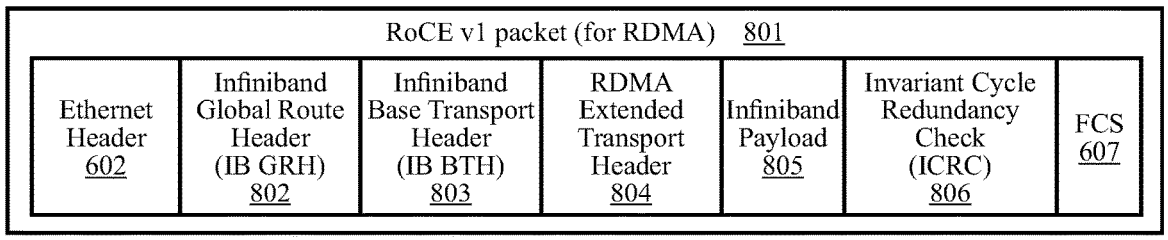
FIG. 8 illustrates a RDMA over converged ethernet, version 1 (RoCE v1) packet according to some aspects.

FIG. 8 illustrates a RDMA over converged ethernet, version 1 (RoCE v1) packet 801 according to some aspects. The format of RoCE v1 packets 801 is specified in "The InfiniBand Architecture Specification Volume 1, Release 1.4" published by the InfiniBand Trade Association on Apr. 7, 2020 ("the InfiniBand Specification"). The RoCE v1 packet 801 can be seen to be an ethernet packet having an Ethernet payload that includes an InfiniBand Global Route Header (IB GRH) 802, an InfiniBand Base Transport Header (IB BTH) 803, an RDMA extended transport header 804, an InfiniBand payload 805, and an Invariant Cyclic Redundancy Check (ICRC) 806 field.

Figure 9:
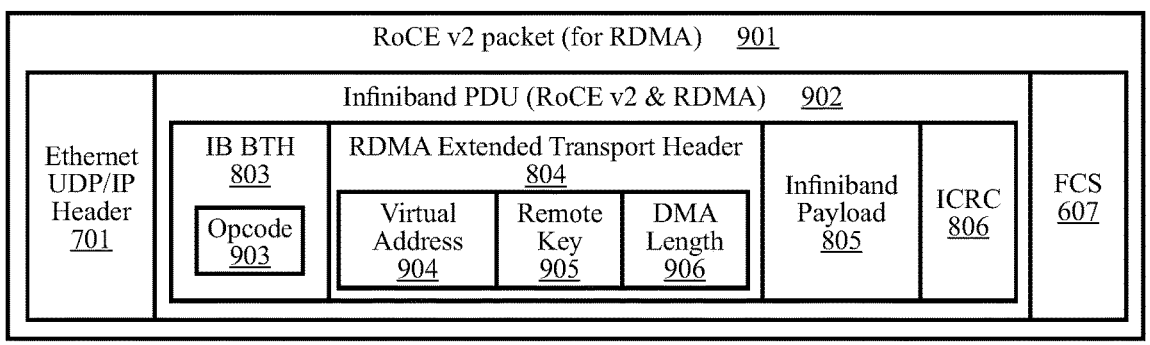
FIG. 9 illustrates a RDMA over converged ethernet, version 2 (RoCE v2) packet according to some aspects.

FIG. 9 illustrates a RDMA over converged ethernet, version 2 (RoCE v2) packet 901 according to some aspects. The format of RoCE v2 packets 901 is specified in the InfiniBand Specification. The RoCE v2 packet 901 can be seen to be an Ethernet UDP/IP packet having a UDP payload that includes an IB BTH 803, an RDMA extended transport header 804, an InfiniBand payload 805, and an ICRC 806. Here, Ethernet is the layer 2 transport for a UDP packet carrying the InfiniBand elements. Other layer 2 protocols may be used as the layer 2 transport. The IB BTH 803 can include the destination queue pair (QP), the operation code 903, packet sequence number, and partition. The RDMA extended transport header 804 contains data fields for RDMA operations such as a virtual address 904, a remote key 905, and a DMA length 906. The remote key can identify a memory region in a remote host. The virtual address 904 can be mapped to a physical address in the memory region. The DMA length can indicate the length, in bytes, of the DMA operation. The ICRC 806 is a CRC covering the fields in the PDU that do not change from the source to the destination.

Figure 10:
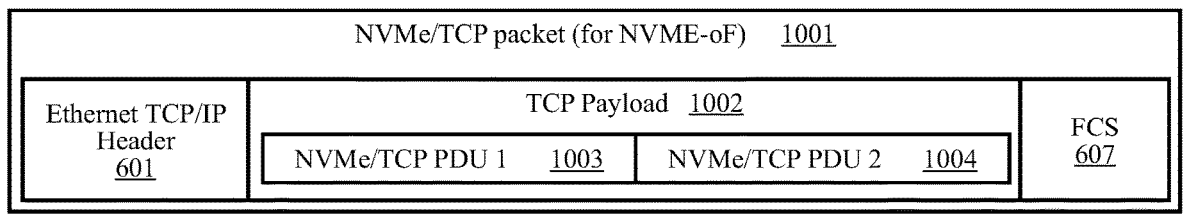
FIG. 10 illustrates a single TCP/IP packet having a TCP payload that includes multiple NVMe/TCP PDUs according to some aspects.
Figure 11:
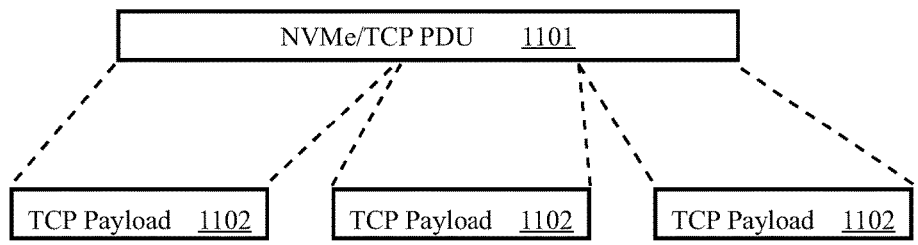
FIG. 11 illustrates a single NVMe/TCP PDU carried by multiple TCP packets according to some aspects.

FIGS. 10-11 illustrate the TCP payloads of NVME/TCP packets that can be used for NVMe-oF. FIG. 10 illustrates a single TCP/IP packet 1001 having a TCP payload 1002 that includes multiple NVMe/TCP PDUs according to some aspects. TCP/IP payload 1002 includes NVMe/TCP PDU 1 1003 and NVMe/TCP PDU 2 1004. FIG. 11 illustrates a single NVMe/TCP PDU 1101 carried by multiple TCP packets according to some aspects. Multiple TCP payloads 1102 of multiple TCP packets carry the NVMe/TCP PDU 1101.

Figure 12:
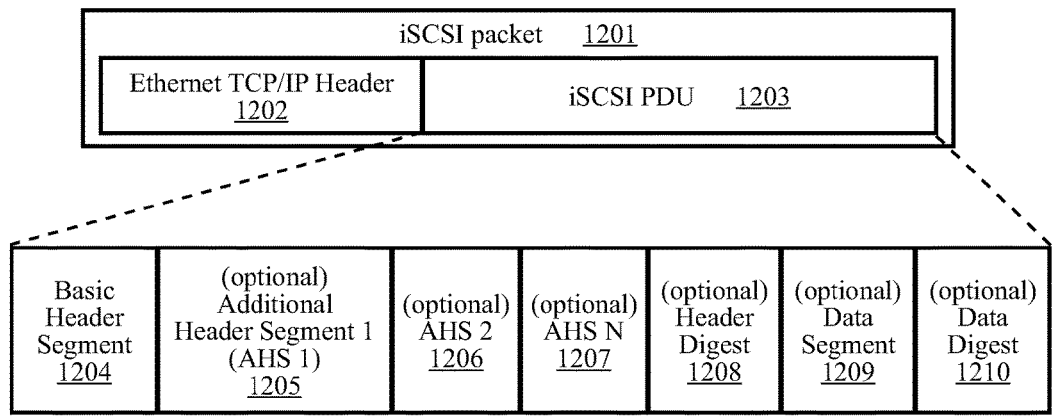
FIG. 12 illustrates an iSCSI packet having an Ethernet TCP/IP header and an iSCSI PDU according to some aspects.

FIG. 12 illustrates an iSCSI packet 1201 having an Ethernet TCP/IP header 1202 and an iSCSI PDU 1203 according to some aspects. The IETF (Internet Engineer Task Force) is a consortium that develops and publishes standards for the Internet in the form of RFCs (requests for comment). The iSCSI packet format is specified in IETF RFC 7143 titled "Internet Small Computer System Interface (iSCSI) Protocol", published in April, 2014. The iSCSI PDU 1203 can contain a basic header segment 1204, a first AHS (additional header segment) 1205, a second AHS 1206, an Nth AHS 1207, a header digest 1208, a data segment 1209, and a data digest 1210.

Figure 13:
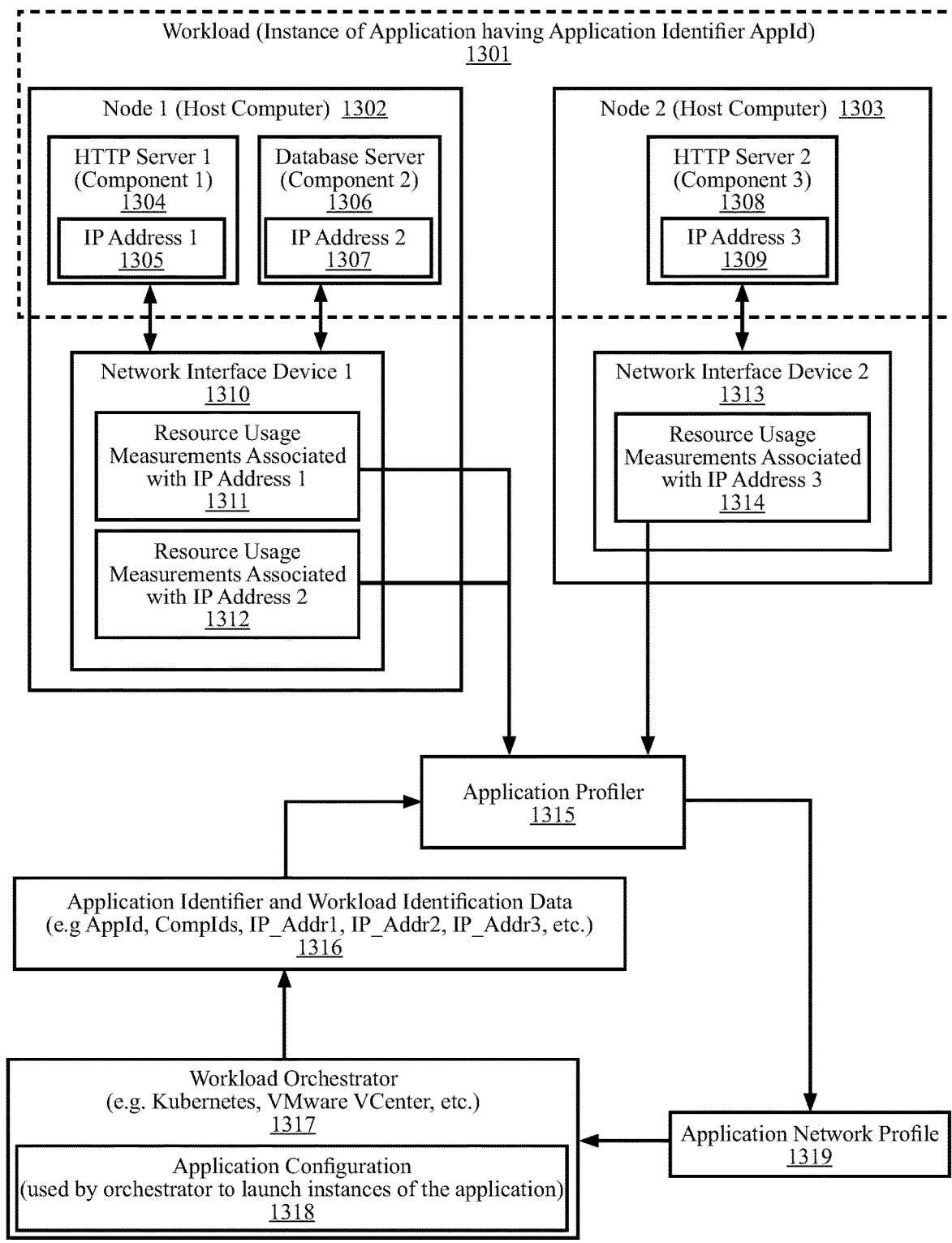
FIG. 13 is a high-level block diagram illustrating the production of an application network profile according to some aspects.

FIG. 13 is a high-level block diagram illustrating the production of an application network profile 1319 according to some aspects. A workload 1301 having three components has been instantiated on two nodes. Component 1 1304 and component 2 1306 have been instantiated on node 1 1302 while component 3 1308 has been instantiated on node 2 1303. Component 1 1304 can be a container or VM having IP address 1 1305. Component 2 1306 can be a container or VM having IP address 1 1307. Component 3 1308 can be a container or VM having IP address 3 1309. Node 1 1302 is configured with network interface device 1 1310. Node 2 1303 is configured with another network interface device 2 1313. The network interface devices 1310, 1313 can be NICs such as NIC 430. Network interface device 1 1310 is providing network services and resources to component 1 1304 and to component 2 1306. As such, network interface device 1 1310 can measure the network resource usage of component 1 1304 and of component 2 1306. Network interface device 2 1313 is providing network services and resources to component 3 1308. As such, network interface device 2 1313 can measure the network resource usage of component 3 1308.

The network resource usage measurements can be associated with workload identification data. In the non-limiting example of FIG. 13, the IP addresses of the components can be used as workload identification data because the network interface devices 1310, 1313 and the workload orchestrator 1317 know the IP addresses. For the network resource usage of component 1 1304, network interface device 1 1310 can store the network resource usage measurements in association with IP address 1 1311. For the network resource usage of component 2 1306, network interface device 1 1310 can store the network resource usage measurements in association with IP address 2 1312. For the network resource usage of component 3 1308, network interface device 2 1313 can store the network resource usage measurements in association with IP address 3 1314. The network resource usage measurements associated with workload identifiers 1311, 1312, 1314 can be provided to an application profiler 1315. The workload orchestrator 1317 can provide application identifier and workload identification data 1316 to the application profiler 1315. The application profiler can use the network resource usage measurements associated with workload identifiers 1311, 1312, 1314 and the application identifier and workload identification data 1316 to associate specific network resource usage measurements with specific applications and components.

In the non-limiting example of FIG. 13, the workload identifiers are the IP addresses of the components. The application identifier and workload identification data can associate an application Identifier (AppId) with the IP addresses and can associate specific component identifiers (CompIds) with specific IP addresses. The application profiler 1315 can therefore use the IP addresses as workload identifiers and can gather statistics and measurements related to the network resource usage of specific applications and of specific components within applications. Based on those gathered statistics and measurements, the application profiler 1315 can produce an application network profile 1319 for the application.

The application network profile 1319 can be provided to the workload orchestrator 1317. Workload orchestrators such as Kubernetes and VMware VCenter can use an application configuration 1318 to select nodes onto which to deploy instances of applications or onto which to deploy components of applications. Currently, the nodes can be selected based on available CPU cores, available server memory, and available storage. The workload orchestrator can be configured to also select nodes based on network resource availability. For example, Kubernetes can use labels and selectors for choosing nodes onto which to deploy components. Kubernetes labels are key-value pairs. The application network profile 1319 can be formatted as key-value pairs that Kubernetes can use as Kubernetes labels.

FIG. 14 is a table of network resource types 1401, usage metrics 1402, and resource usage measurements 1403 according to some aspects. The list of network resource types 1401, usage metrics 1402, and resource usage measurements 1403 provided is a non-limiting example of network resource usage measurements that can be made by a network interface device and provided to an application profiler. For example, the application profile and be a set of key-value pairs associating usage metrics 1402 with resource usage measurements 1403. Alternatively, an ordered list of measurements can be provided wherein the application profiler knows which measurements are provided and the order in which the measurements are provided.

The left most column indicates the network resource types 1401 of the usage metrics 1402. The network resource types can be used for developing application network profiles. An application network profile can be a single number indicating an expected network usage level in general. An application network profile can include a value for each network resource type, thereby indicating an expected usage level for each type of network resource. An application profile can include a value for each usage metric, thereby indicating the expected usages of specific resources. The final two rows are timestamps that can indicate when a workload or component was first seen (e.g., when the IP address was used for the component) and when a workload or component was last seen. The timestamps can be used for calculating time related statistics. For example, the number of connections can be divided by elapsed time to obtain connections per second (CPS).

Figure 15:
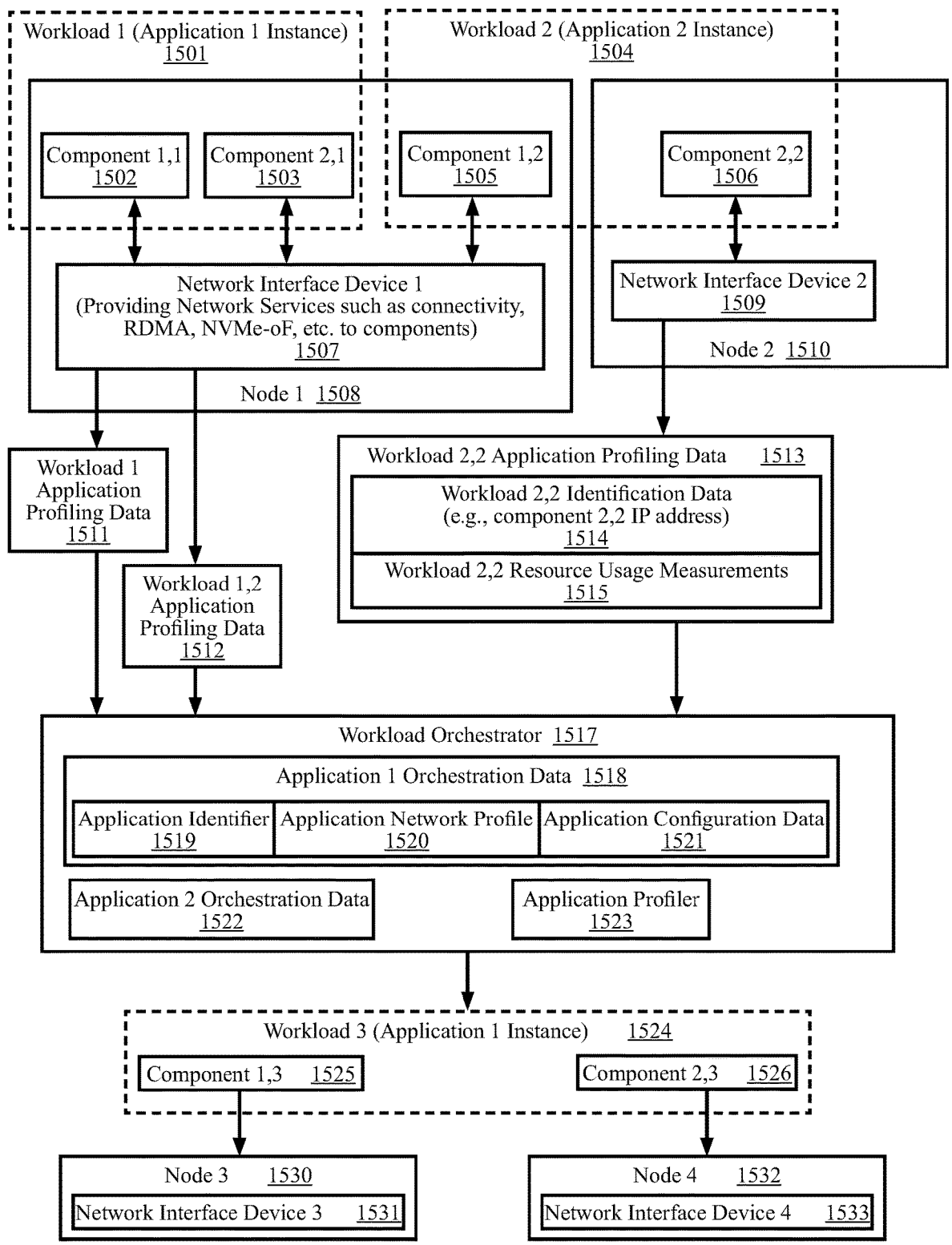
FIG. 15 illustrates a non-limiting example of a workload orchestrator using an application network to launch an additional instance of an application according to some aspects.

FIG. 15 illustrates a non-limiting example of a workload orchestrator 1517 using an application network profile 1520 to launch an additional instance of an application according to some aspects. Application 1 has two components, component 1 and component 2. Workload 1 1501 is an instance of application 1 which has two components, component 1,1 1502 and component 2,1 1503. In FIG. 15, component x,y is component x of workload y. Workload 2 1504 is an instance of a different application, application 2, which has component 1,2 1505 and component 2,2 1506. Component 1,1 1502, component 2,1 1503, and component 1,2 1505 are running on node 1 1508. Network interface device 1 1507 is installed in node 1 1508 and is providing network services and resources to component 1,1 1502, component 2,1 1503, and component 1,2 1505. Component 2,2 1506 is running on node 2 1510. Network interface device 2 1509 is installed in node 2 1510 and is providing network services and resources to component 2,2 1506.

Network interface device 2 1509 measures the network resource usage of component 2,2 1506 and sends the measurements to the workload orchestrator 1517 as workload 2,2 application profiling data 1513. Workload 2,2 application profiling data 1513 includes workload 2,2 resource measurements 1515 and workload 2,2 identification data 1514. The workload 2,2 identification data can be the IP address of component 2,2. Workload 2,2 resource measurements 1515 in workload 2,2 application profiling data 1513 are the measurements for component 2,2. Network interface device 1 1507 measures the network resource usage of component 1,2 1505 and sends the measurements to the workload orchestrator 1517 as workload 1,2 application profiling data 1512. The application profiler 1523 in the workload orchestrator 1517 can use workload 1,2 application profiling data 1512 and workload 2,2 application profiling data 1513 when producing an application profile for application 2. In the non-limiting example of FIG. 15, the application profiler 1523 is shown as included within the workload orchestrator 1517.

Network interface device 1 1508 measures the network resource usage of component 1,1 1502 and component 2,1 1503, and sends the measurements to workload orchestrator 1517 as workload 1 application profiling data 1511. The application profiler can use the workload 1 application profiling data 1511 to produce an application network profile 1520 for application 1.

The workload orchestrator 1517 has orchestration data for application 1 and for application 2. The workload orchestrator 1517 can use the orchestration data to launch additional instances of the applications. Application 1 orchestration data 1518 can contain an application identifier 1519 for application 1, an application network profile 1520 for application 1, and application configuration data 1521 for application 1. Application 2 orchestration data 1522 can contain similar information for application 2. The application configuration data 1521 for application 1 can be used to launch additional instances of application 1.

The workload orchestrator 1517 has been asked to launch another instance of application 1. As such, the workload orchestrator 1517 is launching the additional instance of application 1 as workload 3 1524. Based on the application network profile 1520, component 1,3 1525 is being instantiated on node 3 1530 and component 2,3 1526 is being instantiated on node 4 1532. Network interface device 3 1531 will provide network services and resources to component 1,3. Network interface device 4 1533 will provide network services and resources to component 2,3.

Figure 16:
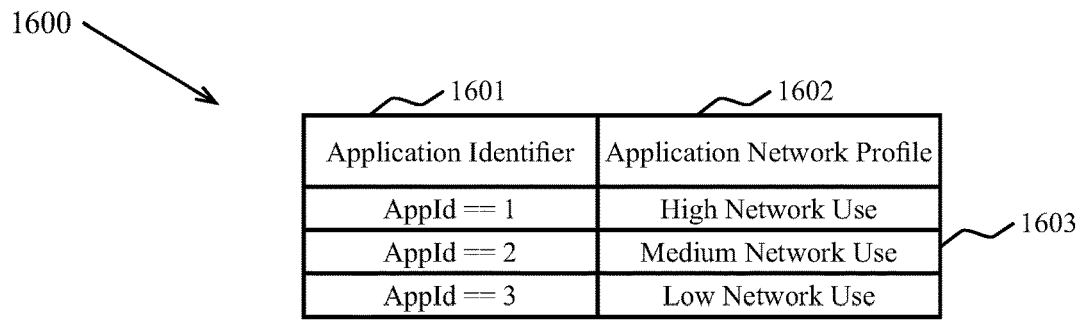
FIG. 16 is a table having application network profiles for applications according to some aspects.

FIG. 16 is a table 1600 having application network profiles 1602 for applications according to some aspects. In FIG. 16, the network usage resource measurements have been collapsed into a single network usage value 1603 for each application and that network usage value is the application's network profile. Such network usage values can indicate the expected levels of network usage. The application having an application identifier equaling 1 (AppId==1) is expected to have a high level of network use. The application having AppId==2 is expected to have a medium level of network use. The application having AppId==3 is expected to have a low level of network use. The network usage values are shown having only three levels: high, medium, and low. Embodiments may use more or fewer levels for the usage metrics. For example, an 8 bit integer could indicate one of 256 levels.

Figure 17:
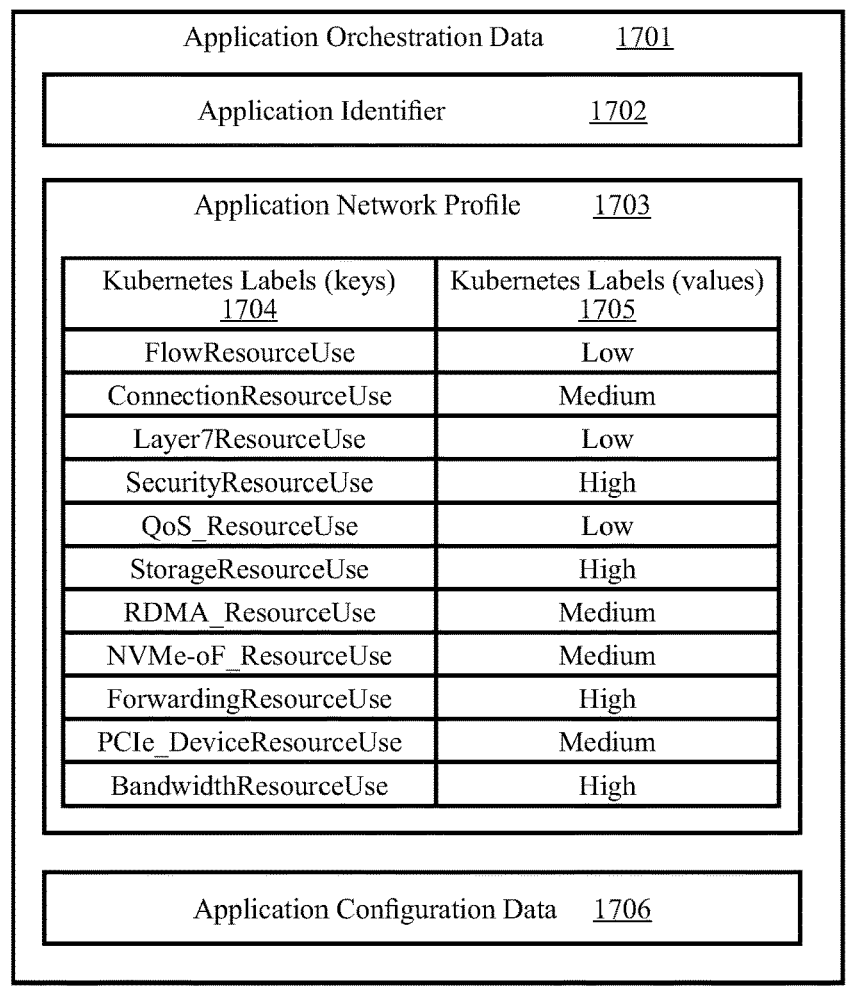
FIG. 17 is a high-level block diagram of application orchestration data according to some aspects.

FIG. 17 is a high-level block diagram of application orchestration data 1701 according to some aspects. The application orchestration data 1701 includes an application identifier 1702, an application network profile 1703, and application configuration data 1706. The application network profile 1703 indicates an expected usage for different network resource types such as the network resource types 1401 shown in FIG. 14. The application network profile is also shown as the key-value pairs of Kubernetes labels.

Figure 18:
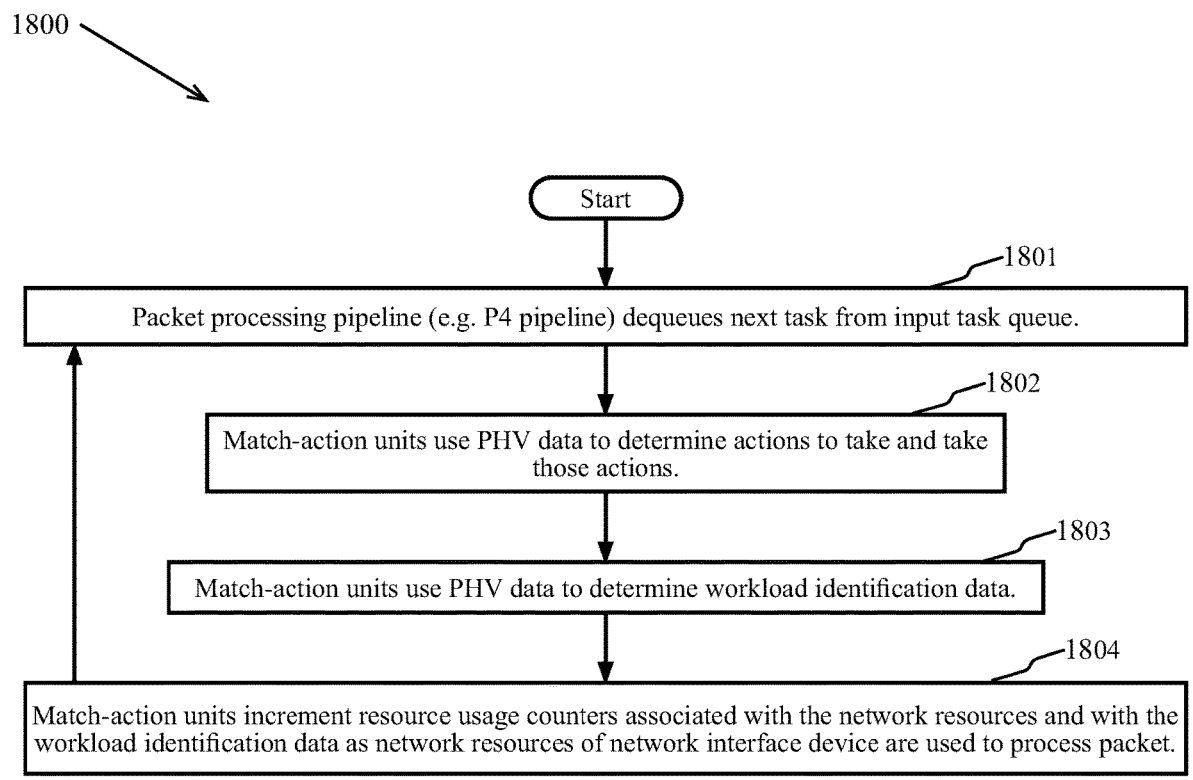
FIG. 18 is a high-level flow diagram illustrating a process for collecting resource usage measurements using a packet processing pipeline according to some aspects.

FIG. 18 is a high-level flow diagram illustrating a process for collecting resource usage measurements using a packet processing pipeline 1800 according to some aspects. After the start, at block 1801 the packet processing pipeline (e.g., P4 pipeline) can dequeue it's next task from an input task queue. At block 1802, the match-action units of the packet processing pipeline can use PHV data to determine actions to take and can take those actions. At block 1803, the match-action units can use PHV data to determine workload identification data. For example, the source IP address 211 can be used as the workload identification data for an outgoing packet while the destination IP address 214 can be used as the workload identification data for an incoming packet. At block 1804, the match-action units can increment resource usage counters associated with the network resources and with the workload identification data as network resources of the network interface device are used to process packets. After block 1804, the process can loop back to block 1801 to continue dequeuing, performing, and measuring tasks.

Figure 19:
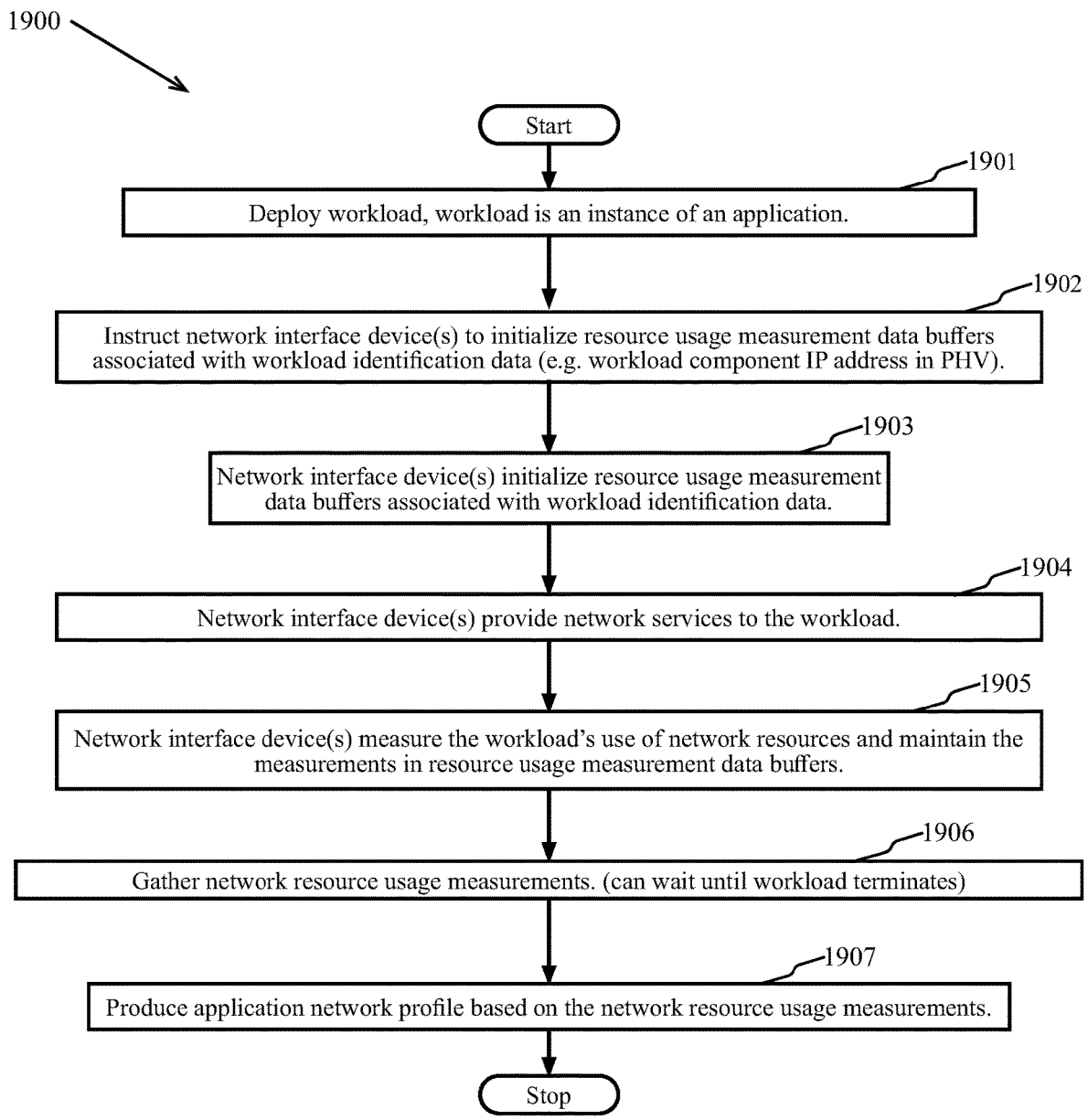
FIG. 19 is a high-level flow diagram illustrating a process for producing an application network profile based on resource usage measurements according to some aspects.

FIG. 19 is a high-level flow diagram illustrating a process for producing an application network profile based on resource usage measurements 1900 according to some aspects. After the start, at block 1901 a workload is deployed. The workload is an instance of an application. At block 1902, the network interface device(s) can be instructed to initialize the resource usage measurement data buffers associated with the workload identification data. For example, the counters for counting network resource usage associated with the IP addresses for components of the workload can be set to zero. At block 1903, the network interface device(s) can initialize the resource usage measurement data buffers associated with the workload identification data. At block 1904, the network interface device(s) provide network services to the workload. At block 1905, the network interface device(s) measure the workload's use of network resources and maintain the measurements in resource usage measurement data buffers. At block 1906, the network resource usage measurements are gathered. The process may wait until the workload terminates before the resource usage measurements are gathered. For example, in FIG. 3 the resources are gathered from two nodes running different components of the workload. Here, "gather" includes reading the data from the network interface devices, receiving the data from the network interfaces devices, etc. At block 1907, the application network profile is produced based on the network resource usage measurements.

Figure 20:
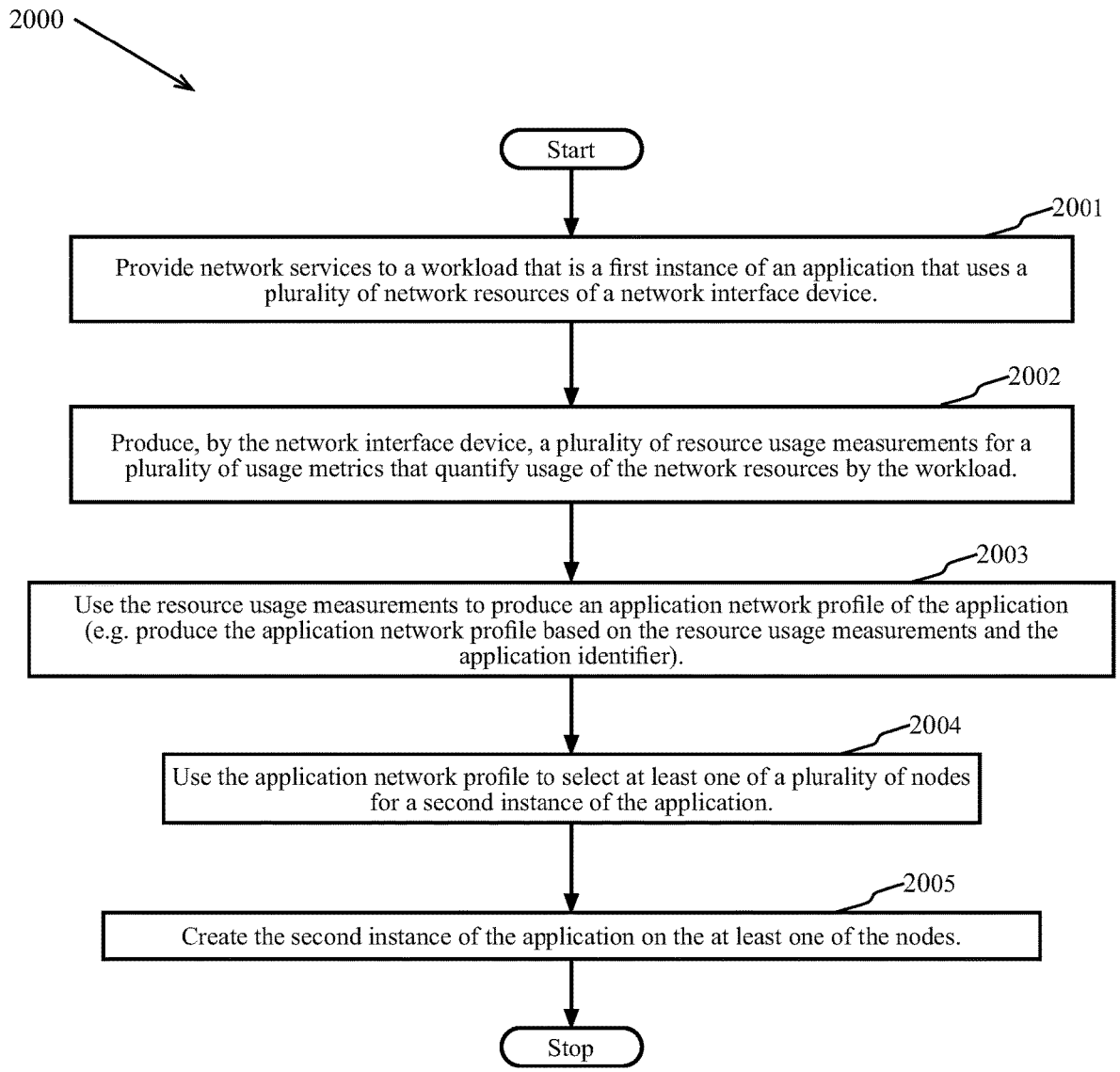
FIG. 20 is a high-level block diagram of a method for accelerated health monitoring for load balancers according to some aspects.

FIG. 20 is a high-level block diagram of a method for accelerated health monitoring 2000 for load balancers according to some aspects. After the start, at block 2001 the method can provide network services to a workload that is a first instance of an application that uses a plurality of network resources of a network interface device. At block 2002, the method can produce, by the network interface device, a plurality of resource usage measurements for a plurality of usage metrics that quantify usage of the network resources by the workload. At block 2003, the method can use the resource usage measurements to produce an application network profile of the application. For example, the method can produce the application network profile based on the resource usage measurements and the application identifier. At block 2004, the method can use the application network profile to select at least one of a plurality of nodes for a second instance of the application. At block 2005, the method can create the second instance of the application on the at least one of the nodes.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
    using a network interface device to provide network services to a workload that is a first instance of an application that uses a plurality of network resources of the network interface device;
    producing, by the network interface device, a plurality of resource usage measurements for a plurality of usage metrics that quantify usage by the workload of the network resources of the network interface device;
    using the resource usage measurements to produce an application network profile of the application;
    using the application network profile to select at least one of a plurality of nodes for a second instance of the application; and creating the second instance of the application on the at least one of the nodes,
wherein the network interface device includes a packet processing circuit that includes at least one match-action unit.

2. The method of claim 1 wherein the packet processing circuit of the network interface device is configured to produce the resource usage measurements.

3. The method of claim 1 further comprising
using workload identification data to associate the workload with an application identifier of the application; and
producing the application network profile based on the resource usage measurements and the application identifier.

4. The method of claim 3, wherein the workload identification data includes an IP address.

5. The method of claim 2 wherein the resource usage measurements quantify the usage of a flow resource, a connection resource, a layer 7 service, a security resource, a QoS resource, a storage resource, an RDMA resource, an NVME-oF resource, a forwarding resource, a bandwidth resource, PCIe physical functions, or PCIe virtual functions.

6. The method of claim 1, wherein the application network profile is associated with a Kubernetes label.

7. The method of claim 1, wherein the application includes a plurality of components configured for running on the nodes as independently deployable services.

8. The method of claim 1, wherein:
the network interface device is a PCIe card installed in a host computer; and
the host computer is running the first instance of the application workload.

9. The method of claim 1, wherein the application network profile includes a plurality of network usage values that are provided to a workload orchestrator configured to launch instances of the application.

10. The method of claim 9, wherein a plurality of Kubernetes labels are associated with the network usage values.

11. The method of claim 1, wherein the application network profile includes a plurality of network usage values associated with a plurality of Kubernetes labels and is provided to a workload orchestrator configured to launch instances of the application.

12. A system comprising:
a network interface device that includes a packet processing circuit that includes at least one match-action unit,
wherein the network interface device is configured to:
provide network services to a workload that is a first instance of an application that uses a plurality of networking resources of the network interface device;
produce a plurality of resource usage measurements for a plurality of usage metrics that quantify usage of the networking resources by the workload; and
provide the resource usage measurements to an application profiler configured to use the resource usage measurements to produce an application network profile of the application for a workload orchestrator configured to launch a plurality of instances of the application on a plurality of nodes based on the application profile.

13. The system of claim 12 further including the application profiler, wherein the application profiler is further configured to:
use workload identification data to associate the workload with an application identifier of the application; and
produce the application network profile based on the resource usage measurements and the application identifier.

14. The system of claim 12 wherein the resource usage measurements quantify the usage of a flow resource, a connection resource, a layer 7 service, a security resource, a QoS resource, a storage resource, an RDMA resource, an NVME-oF resource, a forwarding resource, a bandwidth resource, PCIe physical functions, and PCIe virtual functions.

15. The system of claim 12 wherein a packet processing pipeline of the network interface device is configured to produce the resource usage measurements.

16. The system of claim 12 wherein the network interface device is a PCIe card installed in a host computer running at least one component of the workload.

17. The system of claim 12 wherein the application network profile includes a plurality of network usage values that are provided to the workload orchestrator.

18. The system of claim 12, further including:
the application profiler; and
the workload orchestrator, wherein the application network profile includes a plurality of network usage values associated with a plurality of Kubernetes labels.

19. A system comprising:
a means for producing by a network interface device, a plurality of resource usage measurements for a plurality of usage metrics that quantify usage of network resources by a first instance of an application;
a means for using the resource usage measurements to produce an application network profile of the application;
a means for launching a second instance of the application on at least one of a plurality of nodes selected using the application network profile; and
the network interface device includes a packet processing means that includes a match-action unit.

20. The system of claim 19 wherein the means for producing the plurality of resource usage measurements includes a packet processing pipeline.

* * * * *